United States Patent Office 2,818,411
Patented Dec. 31, 1957

2,818,411

SEPARATION OF GAMMA PICOLINE

Harold L. Dimond, Pittsburgh, Pa., assignor to Pittsburgh Coke & Chemical Company, Pittsburgh, Pa., a corporation of Pennsylvania No Drawing. Application June 21, 1955
Serial No. 517,053

8 Claims. (Cl. 260—290)

The present invention relates to the separation of gamma picoline (4-methyl pyridine) from mixtures thereof with other nitrogen bases such as beta picoline (3-methyl pyridine) and 2,6-lutidine (2,6-dimethyl pyridine) by forming the gamma picoline-oxalic acid complex or salt.

It is an object of the present invention to recover gamma picoline from a gamma picoline-oxalic acid salt.

It is an additional object to recover gamma picoline from said salt without employing large amounts of water or other solvents.

A further object is to provide a practical and commercially attractive process for the isolation and recovery of substantially pure gamma picoline from mixtures thereof with beta picoline and/or 2,6-lutidine.

Yet another object is to prepare the gamma picoline salt of oxalic acid in an improved manner.

A still further object is to separate said salt from mixtures thereof with beta picoline and/or 2,6-lutidine in an improved manner.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Numerous procedures for the separation of gamma picoline from ternary or binary mixtures thereof, containing beta picoline and/or 2,6-lutidine, have been proposed and some have been employed commercially. However, each of these procedures has left much to be desired from the standpoint of economical operation, ease of operation, efficiency of recovery, and/or the realization of the base in sufficiently pure state as to be suitable for further synthesis of valuable and useful products, such as isonicotinic acid.

One such procedure has been described by Alan G. Lidstone (Journal of The Chemical Society, 1940, part 1, page 241), which involves separation of a mixture of beta and gamma picolines from their admixture with 2,6-lutidine in the form of their oxalate salts, followed by separation of the beta and gamma picoline salts by crystallization from alcohol. Fairly satisfactory results can be obtained using the process described by Lidstone on a laboratory scale but, when employed in commercial operations, the process is undesirable. This fact is indicated by the author himself, who states that treatment of batches larger than one hundred grams at a time seriously diminishes the yield.

An improvement on the Lidstone procedure is described in Williams and Hensel application Serial No. 350,762, filed April 23, 1953, and now Patent 2,728,771, December 27, 1955, wherein there is disclosed a process comprising dissolving oxalic acid in a mixture of gamma picoline with beta picoline and/or 2,6-lutidine and then cooling the resulting solution to crystallize out the gamma picoline oxalate. By such a process it has been found that substantially all of the gamma picoline in the mixture can be crystallized out as the oxalic acid salt while the beta picoline and 2,6-lutidine remain in solution. The entire disclosure of the Williams et al. application is hereby incorporated by reference.

While the process recited in the Williams et al. application is highly advantageous, it suffers from the disadvantage that the gamma picoline is recovered by steam distillation of an alkaline solution or by other methods involving the production of a dilute, aqueous solution of gamma picoline.

It has now been found that the formation of a dilute, aqueous solution or other solvent solution of the gamma picoline can be avoided and the gamma picoline can be recovered readily in good yields by heating the gamma picoline-oxalic acid complex to 150–200° C. and recovering the gamma picoline from the distillate. It would be expected that dry distillation would cause a dissociation of the complex into oxalic acid and gamma picoline. From the properties of oxalic acid, it would also be expected that it would sublime, and that it would be necessary to fractionate and separate the gamma picoline. Surprisingly, it was found that this did not occur but instead there was decomposition of the oxalic acid part of the molecule resulting in a distillate composed principally of water, formic acid and gamma picoline, as well as gaseous products including carbon dioxide, some water, some gamma picoline and possibly also some carbon monoxide and hydrogen. The gamma picoline can be readily recovered by drying over a conventional dehydrating agent such as sodium hydroxide, and separating the liquid while the gaseous gamma picoline likewise can be trapped and recovered.

The present process gives a very high grade gamma picoline (95–100% pure) in yields as high as 60–70% of theory. Based on the commercial beta, gamma picoline fraction which is processed with the oxalic acid approximately 30% by weight is recovered as gamma picoline.

The oxalic acid used for the formation of the gamma picoline oxalate composition is preferably anhydrous or substantially so, although hydrates of the acid (e. g. 71.5% to 98% oxalic acid) may be used with some decrease in yields. The gamma picoline oxalate obtained, according to the present process, appears to be principally that containing one mole of picoline per mole of oxalic acid, although other base to acid compositions, such as one containing four moles of picoline per five moles of oxalic acid or two moles picoline per three moles of oxalic acid, may also be present. The quantity of oxalic acid used for the salt formation can be varied but is preferably about the theoretical required to give a 1:1, 2:3, or 4:5 molar ratio of base to acid salt of the gamma picoline, i. e., from 1 to 1½ moles of oxalic acid per mole of gamma picoline in the mixture. Less oxalic acid than that designated above may be used but, in such case, the yield of gamma picoline is lowered. Likewise, an excess of the acid over the preferred range stated may be employed, but such excess causes gummy characteristics in the crystalline oxalate salt composition.

Dissolution of the oxalic acid into the gamma picoline-containing mixture to form the gamma picoline oxalate, according to the invention, can be carried out in any convenient manner. For example, the acid may be added to the picoline mixture with stirring until complete solution is obtained. Preferably, the mixture is warmed to between 50° C. and 110° C. before the acid is added thereto, since this assists the dissolution, although such heating is not essential in view of the exothermic reaction which occurs as the oxalate is formed.

Cooling of the oxalic acid solution for the purpose of crystallizing out the gamma picoline oxalate contained therein can be effected in any desirable fashion, e. g., with an external water bath. Generally, the solution is permitted to reach equilibrium conditions before cooling although this is not necessary. The temperature to which the solution is cooled for recovery of the oxalate may be widely varied with satisfactory results but, normally, need only be sufficiently low to effect complete and otherwise satisfactory crystallization, e. g., a temperature within the range of 25° to 30° C. is usually sufficient. Preferably, cooling is carried out slowly, for instance over a period from 30 to 60 minutes, or even up to 3 hours, to permit optimum crystallization of the desired salt.

After crystallization, the oxalate can be recovered by filtration, preferably by centrifuging.

The formation of the gamma picoline-oxalic acid complex can be used to recover gamma picoline in substantially pure form from any binary or ternary mixtures thereof with beta picoline and 2,6-lutidine. As examples of such binary and ternary mixtures, there may be given ternary "beta-gamma picoline fractions" derived from coal tar bases and containing from 20% to 50% gamma picoline, 30% to 60% beta picoline and 10% to 40% 2,6-lutidine as well as binary mixtures comprising from 20% to 80% gamma picoline with 80% to 20% of either beta picoline or 2,6-lutidine. In addition to the beta picoline and 2,6-lutidine, the mixtures from which the gamma picoline is isolated may contain minor amounts of other compounds normally associated with gamma and beta picolines and 2,6-lutidine such as 2,3-lutidine and alpha picoline which are occasionally found as impurities in beta-gamma picoline fractions.

In the preferred form, the process of the present invention consists simply of heating a beta, gamma picoline mixture with anhydrous oxalic acid to 142° C., distilling out 10% of the original charge weight of beta, gamma picoline fraction to remove all water, cooling, filtering, drying the gamma picoline-oxalate cake formed on a centrifuge, dry distilling the cake, and drying the wet gamma picoline over sodium hydroxide.

For best results in preventing undue caking, the oxalic acid should be added to the beta, gamma picoline fraction with stirring and the stirring should be continued through the subsequent process of forming the precipitate in the state of well defined crystals by slow cooling. This generally takes 1 to 3 hours.

After addition of the oxalic acid, the mixture is heated to 142–143° C. and 10% of the original picoline charge is permitted to distill out as the temperature rises from 95° C. to 143° C. This is done to remove any water which may be present as an azeotrope, from the reaction mixture. While it is not absolutely essential to remove the water which may be present, it has been found that the presence of water is harmful in that it promotes the formation of poorly defined crystals. In addition, the liquid layer is syrupy, slimy and difficult to remove by filtration.

By making use of this distillation step, it is possible to use hydrated oxalic acid rather than the anhydrous acid. However, in such case to insure that all the water will be azeotroped out, it has been found desirable to add considerably more beta, gamma picoline fraction in the initial charge. Thus with a hydrated oxalic acid containing 14.28% water it is advisable to add about 80% more of the beta, gamma picoline fraction than is necessary to insure complete reaction of the gamma picoline content with the oxalic acid. In such process, it is also necessary to distill out more than 10% of the initial charge, e. g., up to 45% of the total charge may have to be distilled, to insure that by the time the distillation temperature has risen from 95° to 142° C. there will be the correct quantity of gamma picoline present to react with the amount of oxalic acid. Whether anhydrous or hydrated oxalic acid be used, the preferred quantity of the oxalic acid is one mole of acid for each mole of gamma picoline which is left in the reaction vessel after the 10% (or 80% with the hydrated oxalic acid recited above) distillation step is completed. The yield of gamma picoline is based on the amount equivalent to the oxalic acid employed since the efficiency of the oxalic acid used is of primary concern. As previously set forth, more or less oxalic acid can be employed than the mol for mol ratio with the gamma picoline which at present is preferred.

The 10% distillation step can be omitted in some instances, especially if all reagents employed are anhydrous, although even then it is preferred to employ this distillation step.

After the clear, homogeneous mixture has been purged of its water, it is preferably cooled rapidly at first (e. g., with external cooling aids) to stop the distillation. The cooling is then permitted to continue slowly during one to three hours to 20° C. While rapid cooling may be employed, slow cooling is preferred as it gives well-defined crystals and thus facilitates filtration.

The white oxalate cake is next filtered and spun dry for 2 to 4 hours on a centrifuge to remove beta picoline and 2,6-lutidine. The use of the centrifuge for drying plays a large part in obtaining a product of high purity. While it is not essential to wash the precipitate, it has been observed that the yield and purity of the gamma picoline product ultimately isolated is somewhat higher if the cake is washed with gamma picoline. Washing the oxalate cake with gamma picoline makes it very hard and almost unmanageable and, hence, frequently this washing step is omitted. One of the virtues of the present process is that the benzene wash employed in some prior art processes with the gamma picoline-oxalic acid cake is eliminated.

It is possible to improve the drying action of the centrifuge by breaking up the cake, before the final period of spin drying. The weight of the cake is then a fair approximation of the yield. One merely compares the actual cake weight to the theoretical weight, obtained by adding the weights of oxalic acid and gamma picoline present after the initial 10% distillation.

The filtrate of the cake is usually discolored and sometimes requires distillation to remove colored impurities. Most of this coloration is due to reaction between the copper and other metals of which the centrifuge is constructed and the picolines and lutidine and/or oxalic acid. This distillation can be avoided if the centrifuge is made of protected or inert materials.

After the above mentioned distillation, the filtrate is dried over flaked caustic, e. g., sodium hydroxide or potassium hydroxide. If desired before treating with the caustic, the filtrate can be combined with the 10% distillate. Preferably, however, these two materials are not combined as the 10% distillate is rich in gamma picoline and can be profitably recycled to the initial reaction vessel to prepare a subsequent batch of pure gamma picoline. Approximately 90% of the gamma picoline depleted filtrate is recovered.

The gamma picoline-oxalate cake is dry distilled during a period of 0.5 to 4.0 hours, preferably about two and one-half hours. The distillation is carried out over any conventional source of constant heat such as an oil bath for example. When the oxalate cake has reached approximately 120° C. the first vapors start to distill at 115° C. While the bath temperature slowly rises to 200° C., the temperature of the oxalate cake rises to 168° C. and the vapor temperature to 114° C. After 2½ hours, the pot temperature rises to about 176° C., and the vapor temperature rises to about 146° C. At the end of the dry distillation, if the temperature is allowed to climb to 230° C., decomposition of the residue begins to fill the flask with red vapors which color the gamma picoline. This coloration may be avoided by carefully keeping the bath temperature at, or near, 200° C., or below. A new charge of oxalate cake from a subsequent run can then be made, and the dry distillation continued. Using this technique, repeated dry distillations may be carried out before the distilling vessel has to be cleaned. When cleaning of the distilling vessel is eventually necessary, it can be easily accomplished with concentrated sulfuric acid or an abrasive soap.

A sample of the distillate of gamma picoline which had become reddened due to too high a temperature of dry distillation was found to lose most of the color on standing overnight. Reddened samples were also found to clear up considerably after the subsequent drying step (e. g., with caustic soda). However, the color is completely and permanently removed only by distillation. Consequently, since one drop of this red decomposition product can color great quantities of distillate, it is extremely important to avoid carrying the dry distillation to complete dryness, and to insure that the oil bath temperature does not reach 230° C. near the end of the dry distillation as otherwise an extra distillation step is necessary.

Large quantities of gas are liberated during the decomposition of the gamma picoline-oxalic acid complex. The primary products formed from the oxalic acid part of the molecule are believed to be carbon dioxide, formic acid and water with possibly minor amounts of carbon monoxide and hydrogen. Provision for the escape of these gases must be made. As the gas stream is saturated with gamma picoline, it is desirable to institute a scrubbing system to minimize the loss of product, the other gases being permitted to escape. Such a scrubbing system can comprise a condenser fitted to the top of the first receiver and a scrubbing flask containing water or an acid solution. A tube connecting the condenser to the scrubber, carried the gaseous by-product to the scrubbing solution. The solution can be any convenient acid, such as hydrochloric or sulfuric acid. The gamma picoline can be recovered by caustic treatment of the picoline sulfate or picoline hydrochloride, etc.

Other methods may comprise recycling the scrubbing liquor (water or acid solution) through a conventional absorption tower counter-current to the gas stream.

To obtain pure gamma picoline, it is necessary to remove the dissolved formic acid, water and carbon dioxide from the gamma picoline produced in the dry distillation step. This can readily be accomplished with the aid of an alkali such as sodium hydroxide, potassium hydroxide, lime and barium oxide and hydroxide. Preferably, the alkali is an aqueous alkali of 20 to 70% concentration. The use of 50% aqueous sodium hydroxide is preferred. It is merely necessary to stir the gamma picoline with dissolved water, etc., with the aqueous sodium hydroxide at room temperature. The amount of aqueous sodium hydroxide or other alkali employed is generally about 0.3 part to 2.0 parts per part of gamma picoline to be purified. The gamma picoline can be separated from the alkali layer by decantation, or the use of a separatory funnel, etc. The gamma picoline thus obtained can then be dried in conventional manner as over flaked sodium hydroxide, flaked potassium hydroxide, aqueous solution of these bases, lime, barium oxide, etc. The gamma picoline thus obtained is quite pure, water-white, and stable to color changes for long periods of time.

Throughout the specification and claims, unless otherwise indicated, all parts and percentages are parts and percentages by weight.

*Example 1*

Into a 1 liter, 3-neck flask, equipped with a thermometer, agitator and distillation condenser, were charged 500 grams of a beta, gamma picoline fraction (44.5% gamma picoline, 30.9% beta picoline and 24.6% 2,6-lutidine). Then, 196 grams of anhydrous oxalic acid was added slowly with stirring. The temperature rose quickly to 60 to 80° C., due to the exothermic nature of the reaction. The mixture was slowly heated with stirring to 142–143° C. The temperature of the reaction mixture gradually rose from 95 to 142° C. while 50 grams (approximately 52 cc.) or 10% of the picoline fraction by weight was distilled out as an aqueous azeotrope. The source of heat was removed and the flask cooled rapidly, e. g., in a cold water bath, to stop the distillation. As soon as distillation ceased, the flask was allowed to cool slowly, i. e., by standing in the room, with stirring until the temperature reached 20° C. This took about 3 hours. Then the precipitate was centrifuged for 4 hours. The filtrate was distilled from 30 grams of sodium hydroxide and dried over sodium hydroxide. 255 grams of dry beta-picoline and 2,6-lutidine (92%) was recovered (92%).

The weight of the dry gamma picoline-oxalate cake (i. e., after removal of the filtrate) was 297.3 grams (about 75% of theory). This dry cake was then dry distilled from a flask immersed in an oil bath during 2½ hours. The oil bath temperature was maintained constant at 200° C. throughout the distillation. The pot temperature was 168° C. at the start of the distillation and 176° C. at the end of the distillation. The vapor temperature was 114° C. at the start of the distillation and 146° C. at the end of the distillation.

The products formed were passed through a condenser and gamma picoline collected in a first collection vessel. The product in this vessel weighed 192.2 grams and was then stirred with 80 grams of 50% sodium hydroxide. The gamma picoline layer was separated from the aqueous layer and dried over flaked sodium hydroxide to give 136 grams of a pure, water-white gamma picoline which was stable to color changes for long periods of time.

The gases which were not retained in the first collection vessel were passed to a scrubbing system comprising a condenser, fitted to the top of the first receiver, and a scrubbing flask, containing 100 grams of a 30% hydrochloric acid solution. A tube connecting the condenser to the scrubber carried the gaseous by-product to the scrubbing solution.

The additional impure gamma picoline recovered by this scrubbing weighed 6 grams. It was treated with 150 grams of 50% sodium hydroxide and then dried over flaked sodium hydroxide to give 4 grams of pure gamma picoline.

The gamma picoline-oxalic acid complex which is decomposed can be formed according to the examples of the Williams et al. application previously referred to as is shown in Examples 2 to 4. However, rather than removing the mother liquor on a filter and washing with a non-solvent, it has been found preferable to employ a centrifuge as in Example 1 above.

*Example 2*

950 grams of beta-gamma fraction, containing 42.1% gamma picoline, 33.2% beta picoline, and 24.7% 2,6-lutidine, as determined by infra-red analysis, were placed in a five liter flask and warmed to about 70° C. 387 grams of anhydrous oxalic acid were added to the agitated mixture for complete solution of the salt with the exothermicity of the salt formation carrying the temperature to about 105° to 110° C. The solution was held at 105° to 110° C. for a few minutes to allow complete equilibrium and the solution then cooled slowly with continued agitation to 25° to 30° C. for the crystallization of the gamma picoline oxalate salt.

The oxalate cake was centrifuged for 4 hours and then dry distilled exactly as in Example 1. The subsequent stirring with sodium hydroxide was done with 160 grams of 50% aqueous sodium hydroxide. As in Example 1, the gases could be scrubbed to recover further gamma picoline.

*Example 3*

950 grams of beta-gamma fraction, containing 29.4% gamma picoline, 36.1% beta picoline, and 34.5% 2,6-lutidine, as determined by infra-red analysis, were placed in a two liter flask and 300 grams of anhydrous oxalic acid added. The mixture was warmed to 90° to 100° C. and held at this temperature with stirring for approximately five minutes. During the warming process, the salt dissolved with the liberation of some heat. The reaction mixture was then cooled, by the application of an external water bath, to 25° to 30° C. for the crystallization of the gamma picoline oxalate salt.

The oxalate cake was centrifuged for 4 hours and then dry distilled exactly as in Example 1. The subsequent stirring with sodium hydroxide was done with 120 grams of 50% aqueous sodium hydroxide. The gases could be scrubbed as in Example 1 to recover additional gamma picoline.

*Example 4*

500 grams of a pyridine fraction, resulting from treatment of a beta-gamma fraction by known methods for the isolation of the beta picoline content, and containing 48.2% gamma picoline and 51.8% 2,6-lutidine, as determined by infra-red analysis, were placed in a two liter flask and warmed to 60° C. 233 grams of anhydrous oxalic acid were added and the solution stirred as the exothermic reaction raises the temperature to 100° to 105° C. The solution was then slowly cooled to 25° to 30° C. for the crystallization of the oxalate salt.

The oxalate cake was centrifuged for 4 hours and then dry distilled and further processed exactly as in Example 1 using the same proportions of all materials.

I claim:

1. A process for separating gamma picoline from a mixture thereof with other basic material consisting essentially of at least one member of the group consisting of beta picoline and 2,6-lutidine, said process comprising the steps of forming a solution comprising oxalic acid dissolved in said mixture, rendering said mixture anhydrous by distilling off a portion of the basic material and recovering gamma picoline in the form of an oxalate salt to the substantial exclusion of the other basic material originally admixed therewith.

2. A process according to claim 1 including the further steps of heating the gamma picoline oxalate to decompose the same into gaseous decomposition products and recovering the gamma picoline from the decomposition products.

3. A process according to claim 1 wherein between about 10% and about 45% of the basic material is removed by the distillation step.

4. A process according to claim 3 including the further step of heating the gamma picoline oxalate to decompose the same treating the decomposition products with alkali to remove the oxalic acid decomposition products contained therein and then separating the gamma picoline from the decomposition products.

5. A process according to claim 1 wherein the oxalic acid is added to the basic mixture in an amount of 1 to 1½ mols per mol of gamma picoline remaining after the distillation step.

6. A process for separating gamma picoline from a mixture thereof with other basic material consisting essentially of at least one member of the group consisting of beta picoline and 2,6-lutidine, said process comprising the steps of forming a solution comprising oxalic acid dissolved in said mixture, rendering said mixture anhydrous by distilling off a portion of the basic material, thereafter cooling said solution to crystallize out the gamma picoline in the form of an oxalate salt to the substantial exclusion of the other basic material originally mixed therewith and thereafter centrifuging to separate the crystals from mother liquor.

7. The process of claim 6 wherein the oxalic acid is added to the mixture in an amount of 1 to 1½ mols per mol of gamma picoline remaining after the distillation step, the centrifuging is carried on for about two to four hours, the crystals of gamma picoline oxalate formed are thereafter heated at 150° C. to 200° C. to decompose them, the gaseous decomposition products are treated with alkali to remove oxalic acid decomposition products contained therein and the gamma picoline in the gaseous decomposition products is separated from the alkali.

8. A process for separating gamma picoline from a mixture thereof with other basic material consisting essentially of at least one member of the group consisting of beta picoline and 2,6-lutidine, said process comprising the steps of forming a solution comprising anhydrous oxalic acid dissolved in said mixture, rendering said mixture anhydrous by distilling off about 10% of the basic material, said oxalic acid being added in an amount molecularly equivalent to the gamma picoline present after said distillation step, thereafter slowly cooling said solution over a period of ½ to 3 hours to about 20° C. to 30° C. to crystallize out the gamma picoline in the form of the oxalate salt to the substantial exclusion of the other basic material originally mixed therewith, then centrifuging for 2 to 4 hours to separate the crystals from the mother liquor, dry distilling said crystals at a bath temperature of 150° C. to 200° C. to decompose the oxalate, collecting the gamma picoline present in the decomposition product, stirring said gamma picoline with concentrated aqueous sodium hydroxide to remove oxalic acid decomposition products therefrom and then drying said gamma picoline over solid sodium hydroxide.

References Cited in the file of this patent

UNITED STATES PATENTS

| | | |
|---|---|---|
| 2,420,529 | Engel | May 13, 1947 |
| 2,681,341 | Cronheim et al. | June 15, 1954 |
| 2,728,771 | Williams et al. | Dec. 27, 1955 |

OTHER REFERENCES

Lidstone: J. Chem. Soc. (London) 1940, p. 241.
Badger et al.: Chem. Abst., vol. 44, col. 4906 (1950).
Karrer: "Org. Chem." (Elsevier, 2nd Eng. Ed.) p. 98 (1940).